United States Patent [19]

Fitzgerald et al.

[11] 4,301,929
[45] Nov. 24, 1981

[54] MULTIPLE-CAROUSEL MICROFICHE STORAGE AND RETRIEVAL SYSTEM

[75] Inventors: Timothy P. Fitzgerald, Los Angeles; Lubomir Novak, Marina del Rey; Larry O. Engman, Redondo Beach, all of Calif.

[73] Assignee: Image Systems, Inc., Culver City, Calif.

[21] Appl. No.: 118,687

[22] Filed: Feb. 5, 1980

[51] Int. Cl.³ .............................................. B07C 5/34
[52] U.S. Cl. .................................. 209/608; 209/3.1; 209/610; 353/27 R
[58] Field of Search ................ 209/3.1, 3.3, 552, 569, 209/583, 608, 609, 610; 221/DIG. 1; 353/25, 27 R, 27 A

[56] References Cited

U.S. PATENT DOCUMENTS

| | | | |
|---|---|---|---|
| 3,482,687 | 12/1969 | Irasek | 209/609 |
| 3,747,754 | 7/1973 | Nix et al. | 209/608 |
| 3,800,942 | 4/1974 | Hirata et al. | 209/609 |
| 3,930,992 | 1/1976 | Baumel et al. | 209/552 |

*Primary Examiner*—Joseph J. Rolla
*Attorney, Agent, or Firm*—Fulwider, Patton, Rieber, Lee & Utecht

[57] ABSTRACT

Apparatus for storing and retrieving large volumes of microfiche data, and a related method for its operation. The apparatus includes a number of conventional microfiche storage carousels, all mounted on a rotatable turntable to provide the increased storage capacity. Upon selection of a particular fiche for display, the turntable is rotated, if necessary, in an optimum direction and at an optimum speed, until the selected carousel reaches an operative position with respect to a retrieval station, which is then moved to an operative position with respect to the carousel for withdrawal of the selected fiche within the carousel.

16 Claims, 12 Drawing Figures

MULTIPLE-CAROUSEL MICROFICHE STORAGE AND RETRIEVAL SYSTEM

BACKGROUND OF THE INVENTION

This invention relates generally to optical data storage and retrieval systems, and, more particularly, to such systems utilizing microfiche storage elements in the form of cards or sheets, each of which contains a number of separate frames or pages of optical information, greatly reduced in size from their original form. Thus, for example, many pages of a book or other document may be stored on a small fiche measuring only a few inches in each direction.

In a microfiche storage and retrieval system, means must be provided for storing a large number of such fiche elements, and for retrieving any selected frame of information on command. One convenient way to accomplish this is to place the fiche in generally radial positions in a circular carousel. When a selection command is provided to the system, typically through a keyboard, the carousel is rotated with respect to a stationary retrieval station until a desired fiche is positioned in an operative relationship with the station, then the fiche is withdrawn and conveyed to an x-y positioning mechanism, which translates the selected fiche in two dimensions to locate the selected frame or page. An optical viewing system then displays the selected page on a screen. When another command is given, the selected fiche is replaced in its original position in the carousel, after which the carousel may be rotated again to locate the next desired frame of information. Such a system is fully described in U.S. Pat. No. 3,429,436 issued in the name of Eugene H. Irasek.

The principal limitation of the carousel microfiche systems of the general type described above is one of storage capacity. A number of microfiche applications, including, for example, searching some of the larger subclasses in the Patent and Trademark Office patent files, require a much larger microfiche capacity than is available from a single carousel. Although a number of retrieval devices may be interconnected and controlled by means of a computer, such an arrangement is cumbersome in some respects, and uses storage space inefficiently. Moreover, the computer is a costly component of the system, and may not be needed for purposes other than controlling multiple carousels.

Accordingly, there is a definite need in this field for a carousel-type microfiche storage and retrieval system with a capacity much larger than is presently available in single-carousel systems. The present invention satisfies this need.

SUMMARY OF THE INVENTION

The present invention resides in a multiple-carousel microfiche storage retrieval system in which a plurality of microfiche carousels are disposed about a turntable or platform that is rotatable with respect to a retractable retrieval station. When a command is given to select a particular fiche, the retrieval station is retracted with respect to the turntable, and the turntable is rotated, if necessary, to position the carousel in which the selected microfiche is located next to the retrieval station. Then the retrieval station is moved into an operative position with respect to the selected carousel, and the selected fiche is located and withdrawn in the same manner as in a conventional single-carousel system. Subsequently, when a new microfiche is selected for display, the one presently being displayed is returned to its position in the carousel, the retrieval station is retracted, and the turntable is rotated, if necessary, to find the next selected microfiche.

In general terms, then, the apparatus of the invention comprises a rotatable turntable, a plurality of microfiche storage carousels rotatably mounted about the turntable, a retrieval station movable between a retracted position in which the turntable is free to rotate, and an operative position in which a fiche may be withdrawn from one of the carousels, and means for rotating the turntable to position a selected carousel in an operative relationship with the retrieval station. More specifically, the means for rotating the turntable includes a reversible drive motor, means for determining the optimum direction and speed of rotation to position the desired carousel in the operative position, and means for detecting the position of the turntable with respect to the retrieval station. The means for detecting the position of the turntable with respect to the retrieval station has two basic components. First, means are provided for detecting the identifying number of the carousel that is currently in position at the retrieval station, or is within a preselected angular range of the retrieval station. Secondly, precision sensing means are provided for detecting the displacement of the carousel with respect to the retrieval station.

In operation, the system of the invention first determines which direction of rotation should be used to place the selected carousel in the operative position. Then the drive motor is actuated at high speed until the selected carousel is within a first preselected angular distance of the operative position, after which the motor is driven at a lower speed until the selected carousel reaches a second preselected angular distance with respect to the operative position. At this time, servo control means are utilized to position the turntable more accurately with respect to the retrieval station. After the turntable has reached the operative position, the retrieval station is moved from its retracted position and the selected fiche is withdrawn and displayed in a conventional manner. Detent means may also be provided to retain the turntable positively in its angular relationship with the retrieval station during the time that the microfiche is being retrieved, displayed and replaced.

It will be appreciated from the foregoing, that the present invention represents a significant advance in the field of microfiche storage and retrieval systems. In particular, it provides a large-capacity microfiche system without the need for a controlling computer, and without using an extremely large carousel, which would constitute a most inefficient use of storage space. Other aspects and advantages of the invention will become apparent from the following more detailed description, taken in conjunction with the accompanying drawings.

DETAILED DESCRIPTION

As shown in the drawings for purposes of illustration, the present invention is concerned with microfiche storage and retrieval systems, and particularly with such systems that utilize carousels for storage of microfiche elements. Although a single-carousel system is satisfactory for most applications, a much larger storage capacity is sometimes required. Prior to this invention, the storage capacity could be increased only by interconnecting a number of separate units and controlling them by a programmed computer, or by building a larger carousel. These solutions are costly and make less efficient use of storage space.

Figure 1:
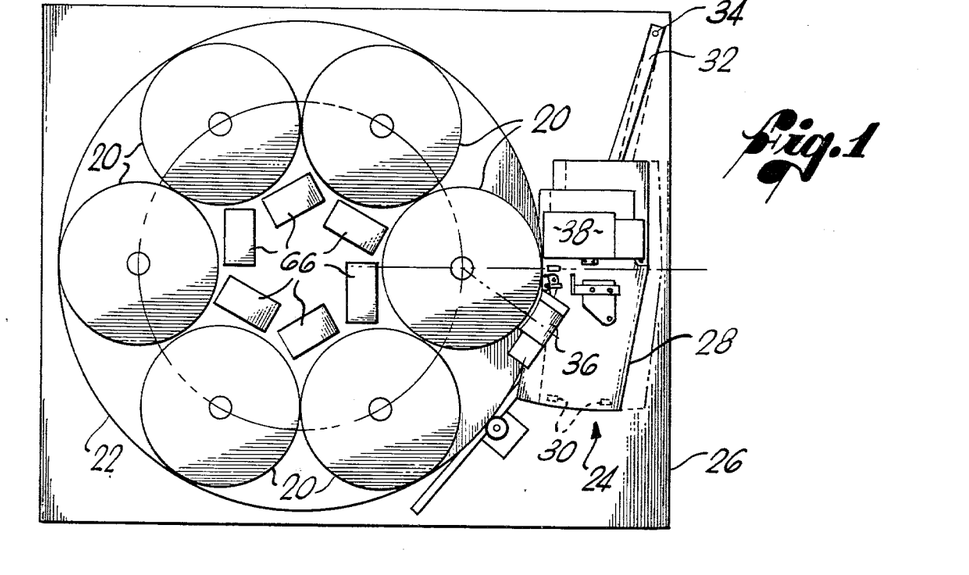
FIG. 1 is a simplified plan view of a multiple-carousel microfiche storage and retrieval system in accordance with the invention.
Figure 2:
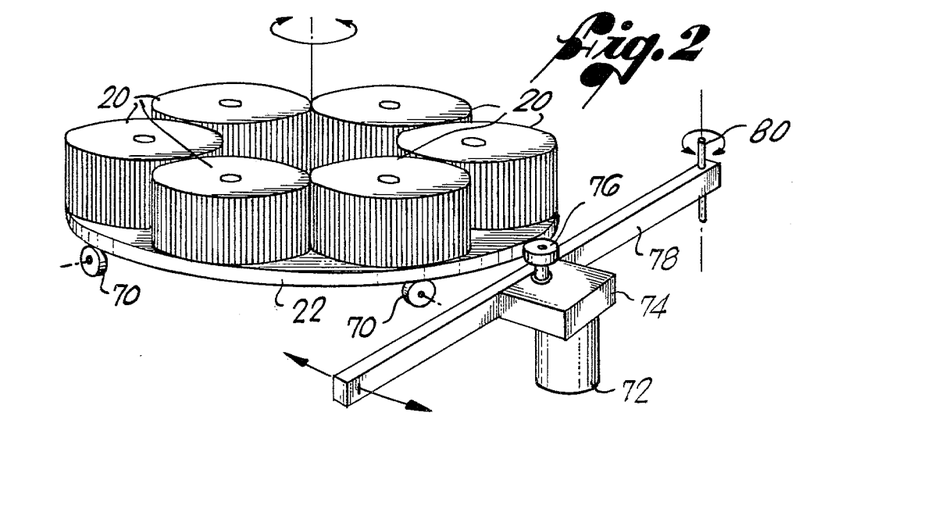
FIG. 2 is a simplified and fragmentary perspective view of the system, showing a turntable drive mechanism.

In accordance with the present invention, and as shown in FIGS. 1 and 2, the storage capacity of a microfiche storage and retrieval system is greatly increased by providing a plurality of carousels, indicated by reference numeral 20, rotatably mounted on a turntable 22, which is itself rotatable to position a selected carousel in alignment with a retrieval station 24. The turntable 22 is rotatably mounted in a generally rectangular frame 26, and the retrieval station 24 is mounted on a base-plate 28, which is supported on rollers 30 on the frame. The base-plate 28 is attached to one end of a lever 32, which is pivotally attached to the frame 26, as shown at 34, for movement in a horizontal plane. The retrieval station, which includes a selector mechanism 36 and an x-y positioning mechanism 38 used for locating a particular microfiche page, is pivotally movable about the pivot point 34 between an operative position, shown in solid lines FIG. 1, and a retracted position, shown in broken lines in the same figure.

Figure 3:
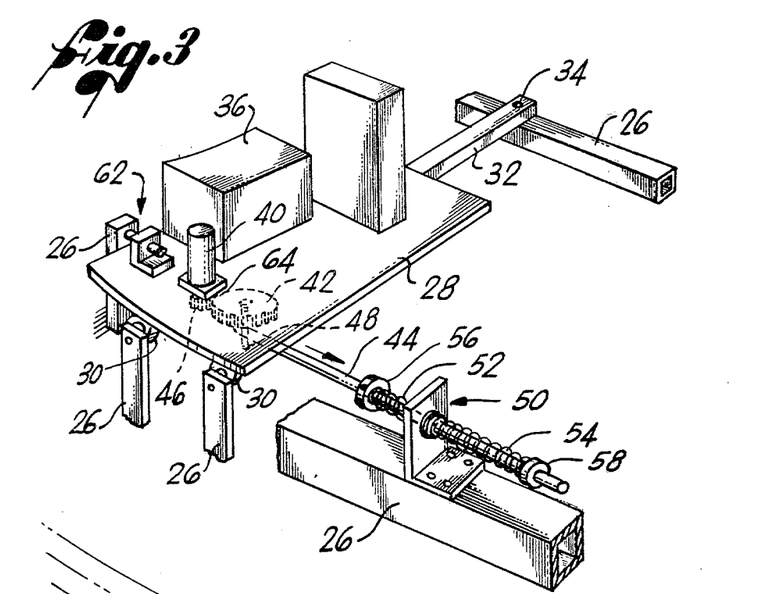
FIG. 3 is a simplified perspective view of a retrieval station and its retraction mechanism.

As best shown in FIG. 3, the mechanism for moving the retrieval station 24 includes a drive motor 40 mounted on the base-plate 28, a gear wheel 42 also rotatably mounted on the base-plate, and an actuating rod 44. The drive motor 40 has a drive-shaft pinion 46, which is permanently engaged with the gear wheel 42. One end of the rod 44 is attached to the periphery of the gear wheel 42 by means of an upstanding post 48 affixed to the gear wheel and extending through a diametric hole through an end portion of the rod. The other end of the rod 44 passes slidingly through a ball joint 50 rigidly attached to the frame. Two coil springs 52 and 54 are positioned one on each side of the ball joint 50 and between the ball joint and two respective rings 56 and 58 secured to the rod. When the drive motor 40 is actuated, the gear wheel 42 is rotated and the rod 44 is thereby moved with respect to the base-plate 28. The coil spring 52, which is preloaded and held by adjustable shaft ring 56, urges the baseplate 28 toward a mechanical stop 62 when the baseplate is in the operative position. A minimum amount of pressure is needed for holding the baseplate 28 securely in the operative position. Coil spring 54, held by shaft ring 58, preloads spring 52. This preload force must be larger than the force necessary to relocate the baseplate to the retracted position. When the post 48 is moved to a dead-center position furthest from the turntable 22, the baseplate is then in the operative position and is held in that position by action of the spring 52, urging the baseplate against a mechanical stop, indicated at 62. When the gear wheel 42 is rotated through approximately 180 degrees, to the opposite dead-center position indicated at 64, the base-plate 28 is withdrawn from the turntable 22 to the retracted position.

Each of the carousels 20 has its own drive unit, indicated at 66, operable to rotate the carousel 20 on command, in order to locate a selected fiche element stored therein. By way of background, the fiche elements stored in the carousels 20 are identified by means of coded notches or projections on the ends of the fiche elements. Other techniques could be used, of course, such as assigning a unique storage address to each fiche location in the carousel, and then rotating the carousel to the desired address in order to locate a desired fiche. Using coded fiche elements has the advantage, however, that the fiche need not be stored in any particular locations in the carousel. In any event, these considerations are not critical to the present invention, which relates only to the concept of utilizing a plurality of carousels mounted on a rotatable turntable.

As best shown in FIG. 2, the turntable 22 is supported in the frame of rollers 70, and is rotated by means of a drive motor 72. In the illustrative embodiment, the drive motor 72 is connected through reduction gearing, indicated at 74 to a drive wheel 76 that can be releasably engaged, in a friction drive arrangement, with the periphery of the turntable. As shown by way of example, the drive motor 72 and reduction gear 74 may be mounted on a lever arm 78 which, when pivoted about a pivot point 80, places the drive wheel 76 in engagement with the periphery of the turntable.

Figure 4:
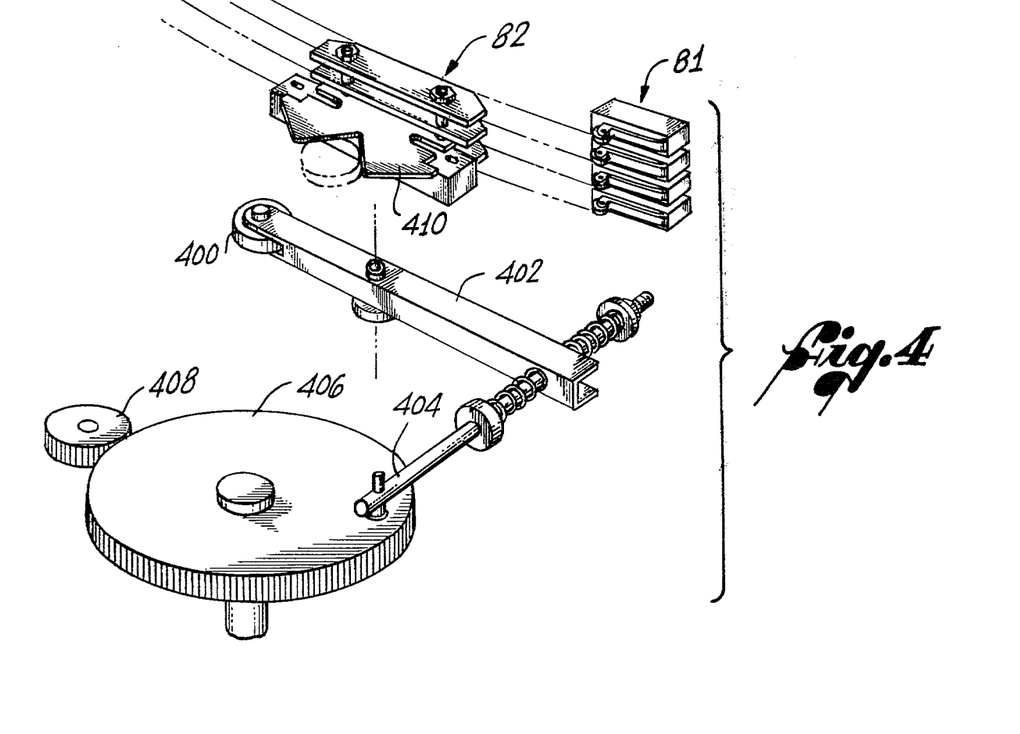
FIG. 4 is a fragmentary perspective view showing a carousel identification mechanism and an optional electromechanical turntable detent.
Figure 5:
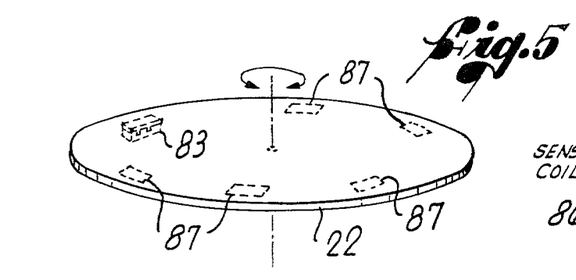
FIG. 5 is a simplified perspective view of the turntable, showing the elements of a position-sensing transducer.

As is best shown in FIG. 4, means are provided for identifying the carousel currently in the operative position adjacent to the retrieval station 24. The means employed in the presently preferred embodiment of the invention includes four electrical contact switches 81 mounted in a fixed relationship to the frame 26, and a set of actuating segments 82 for each of the carousels 20. The actuating segments 82 are mounted on the turntable 22 and spaced 60 degrees apart in the same manner as the carousels. Three of the segments 82 in each set form a binary-coded carousel address, and the fourth segment provides a strobe signal for use in reading the carousel address, and to indicate that a carousel is approaching the operative position. The strobe segment is slightly shorter than the address segments, and subtends an angle of approximately 3.2 degrees with respect to the turntable axis, to provide the strobe signal at about 1.6 degrees from the operative position. The switches 81 therefore provide an indication of the instantaneous carousel address, i.e., the number of the carousel that is presently positioned adjacent to the retrieval station, or is closely approaching the retrieval station.

Figure 6:
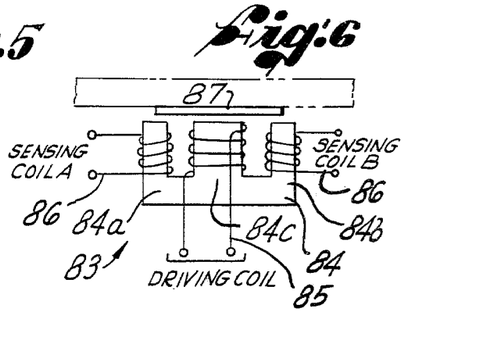
FIG. 6 is a diagrammatic view of the position-sensing transducer.

The switches 81 provide only a relatively coarse indication of the turntable position. A more accurate form of position sensing is provided by means of a magnetic transducer 83 illustrated diagrammatically in FIG. 6. The transducer 83 includes an E-shaped core 84 of magnetic material, having a center leg 84c on which a driving coil 85 is wound and two outside legs 84a and 84b on which two sensing coils 86 are wound. Six transducer plates 87 are spaced uniformly around the underside of the turntable 22 at positions corresponding to the locations of the carousels 20. When any of the plates 87 is located symmetrically with respect to the transducer 83, the magnetic flux distribution through the core 84 will also be symmetrical. Consequently, if an alternating current is applied to the driving coil 85, identical voltages will be induced in the two sensing coils 86 only when one of the transducer plates 87 is symmetrically disposed above the transducer. If one of the transducer plates 87 is positioned off-center, the voltages in the sensing coils 86 will not be balanced. As will be appreciated from the following description of the electrical control circuitry associated with the turntable drive, this unbalance is used to control the turntable speed until a desired carousel is exactly positioned in an operative relationship with the retrieval station 24.

Figure 8:
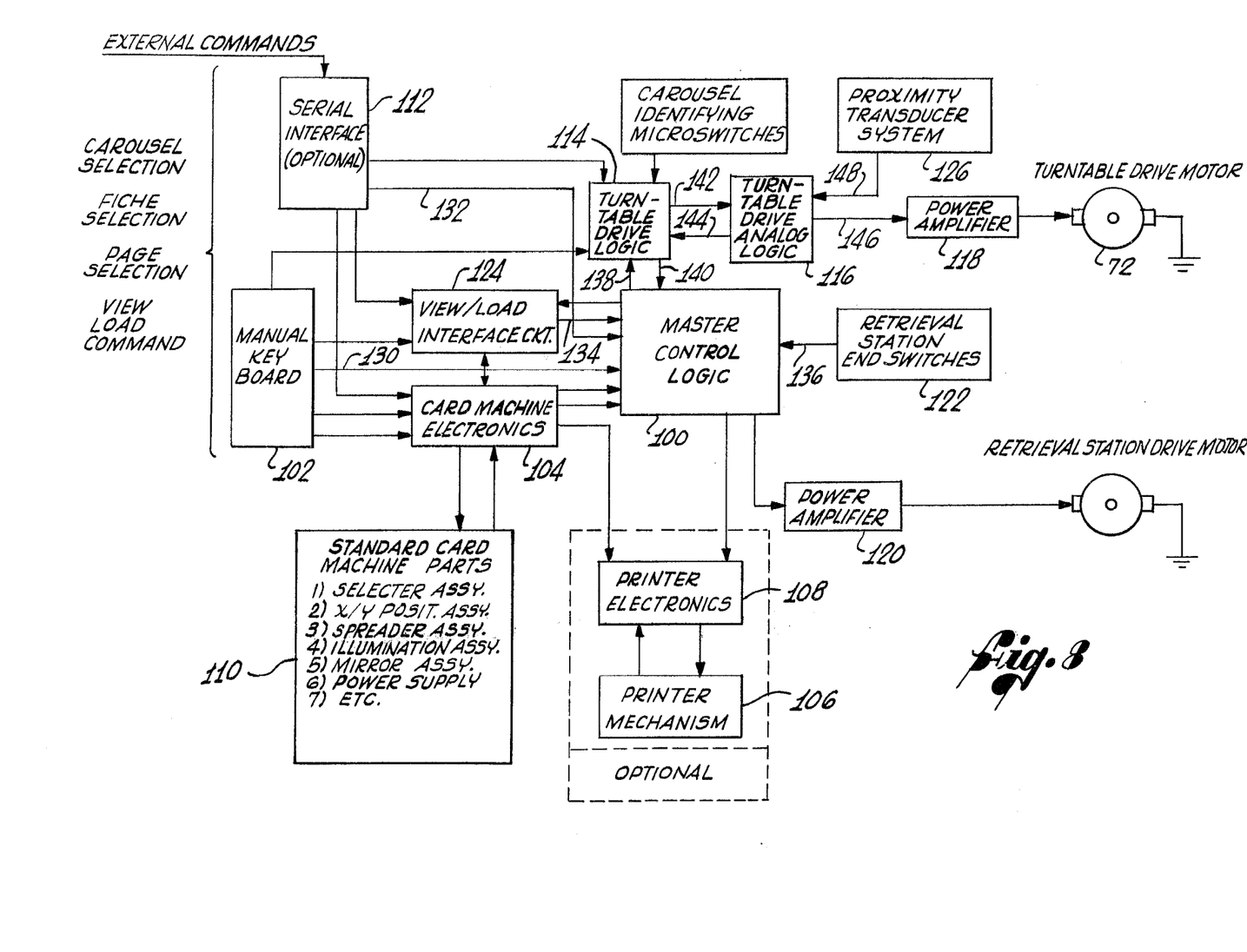
FIG. 8 is a block diagram of the system of the invention.

FIG. 8 shows the basic components of the multiple-carousel system of the invention in block diagram form. The system is controlled by a module referred to as the master control logic 100, which will be explained in more detail below. The components illustrated in FIG. 8 include some that form no part of the invention and are conventional components of a single-carousel storage and retrieval system, such as the one defined in the aforementioned patent (U.S. Pat. No. 3,429,436). Components in this category include a manual keyboard 102, the conventional single-carousel electronics 104, an optional printer mechanism 106 and associated electronics 108, and a group of other standard component parts indicated in block 110, including the selector mechanism 36, the x-y positioning assembly 38, a spreader assembly (not shown) used to spread the fiche on each side of a selected fiche prior to withdrawal from a carousel, an illumination assembly, a mirror assembly and a power supply, none of which are specifically shown. As also shown in FIG. 8, the system may include an optional serial interface 112 to provide for connection to an external control device, such as a digital computer.

The other basic elements of the system are: turntable drive logic 114, a turntable drive analog section 116, two power amplifiers 118 and 120, retrieval station end switches 122, a view/load interface circuit 124, and a proximity transducer system 126, which includes the transducer and transducer plates previously described.

The master control logic 100 controls all machine sequencing during a retrieval or display operation. It directly controls the positioning of the retrieval station 24, and indirectly controls the turntable 22 and the conventional single-carousel machine electronics 102. It will be seen that the master control logic 100 receives command information from the keyboard 102 over line 130 and, optionally, from the serial interface 112, over line 132. The master control logic 100 also receives signals over line 134 from the view/load interface circuit 124, which operates to transform relatively high-voltage signals from the manual keyboard 102 into corresponding signal levels compatible with CMOS circuitry employed in the master control logic 100. The retrieval station end switches 122 indicate whether the retrieval station 24 is in its retracted or its operative or select position, and the status of these switches is conveyed to the master control logic over line 136. The turntable drive logic 114, with which the master control logic 100 communicates, as indicated by lines 138 and 140, monitors the current or instantaneous carousel number, indicated by the carousel identifying switches 81, and the selected carousel number. It communicates with the turntable drive analog section 116 over lines 142 and 144, and provides instructions to the analog section with respect to direction and speed of the turntable. The turntable drive analog section 116 in turn generates the actual drive signals to be supplied over line 146 to the power amplifier 118 and thence to the turntable drive motor 72. The proximity transducer system 126 supplies information to the turntable drive analog section 116 over line 148, and controls a servo system, contained within the analog section, used to position the turntable accurately with respect to the retrieval station 24.

Figure 9:
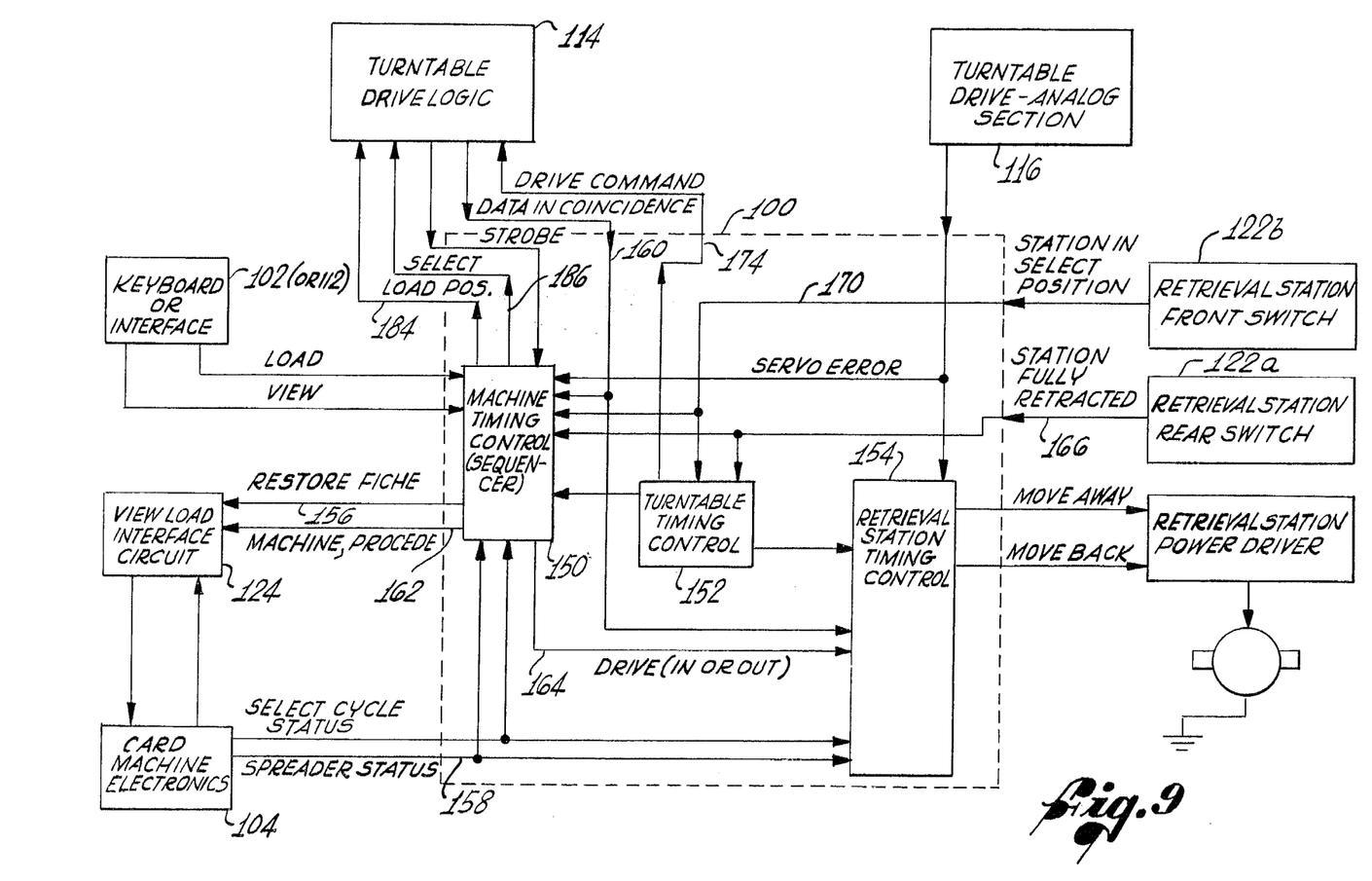
FIG. 9 is a more detailed block diagram including the master control logic shown in FIG. 8.

The master control logic 100, as shown in more detail in FIG. 9, includes a machine timing control or sequencer 150, a turntable timing control 152, and a retrieval station timing control 154. The machine timing control 150 is the main sequencer and event counter for the entire system. When an operator actuates a "view" or "load" key on the keyboard 102 to start an operation, the sequencer instructs the conventional machine electronics 104 to restore the fiche presently being displayed back into the carousel 20. This instruction is issued over line 156 to the view/load interface circuit 124. The sequencer 150 monitors a status line 158 from the machine electronics 104 to determine the status of a spreader device located in the retrieval station 24. This status line will indicate when the fiche has been restored, and the spreader fingers (not shown) removed from the stack of microfiche. The sequencer 150 then checks a data-in-coincidence status line 160 from the turntable drive logic 114 to determine if the requested carousel address is the same as or different from the address of the carousel presently in the operating position. If the same carousel is requested, no further movement of the turntable 22 is required, and the sequencer 150 instructs the machine electronics 104 to proceed, by means of a signal transmitted over line 162 to the view/load interface circuit 124. If the requested carousel address is different from the current carousel address, the sequencer 150 instructs the machine electronics 104 to rotate the carousel approximately 30 degrees, moving the previously selected fiche back within the carousel, so that the retrieval station 24 can be retracted from the turntable 22. The sequencer 150 then sends an instruction over line 164 to the retrieval station timing control 154, to drive the retrieval station 24 out from the turntable. A retrieval station rear switch 122a is actuated when the retrieval station is fully retracted, sending a signal over line 166 back to the sequencer 150, to terminate the drive-out signal on line 164.

When the retrieval station 24 is fully retracted, the sequencer 150 gives control to the turntable drive logic 114, which controls the positioning of the turntable 22 to position the selected carousel in alignment with the retrieval station 24. A data-in-coincidence signal appears on line 160 when the selected carousel closely approaches the operative position, and the servo control subsystem included within the turntable drive analog section 116 takes over to complete the selection process. After the newly selected carousel is accurately positioned at the selection station, a zero servo error signal is generated on line 168 from the turntable drive analog section 116, indicating that the turntable has come to rest in the desired position. Then the sequencer 150 issues a drive-in signal line to the retrieval station timing control 154, over line 164, and monitors a station-in-select-position line, indicated at 170, from a front retrieval station switch 122b. At this point the system is ready to complete the actual fiche selection, which is initiated by the sequencer 150 through the proceed signal line on line 162. Finally, when the fiche has been selected and displayed, a status signal appears on the select cycle status line, line 172, and the selection process is completed.

The turntable timing logic 152 acts principally as an interlock for the turntable drive logic 114. When the sequencer 150 gives the command to select a new carousel, the timing control circuits within block 152 check various machine components to insure that the turntable can be rotated without damaging any of the other components. If it is determined that everything is in order, a drive command signal is issued on line 174 to the turntable drive logic 114. The retrieval station timing control 154 performs a similar function with respect to control of the retrieval station 24. In addition it controls the positioning of the retrieval station 24 when power is first applied to the system.

Figure 10:
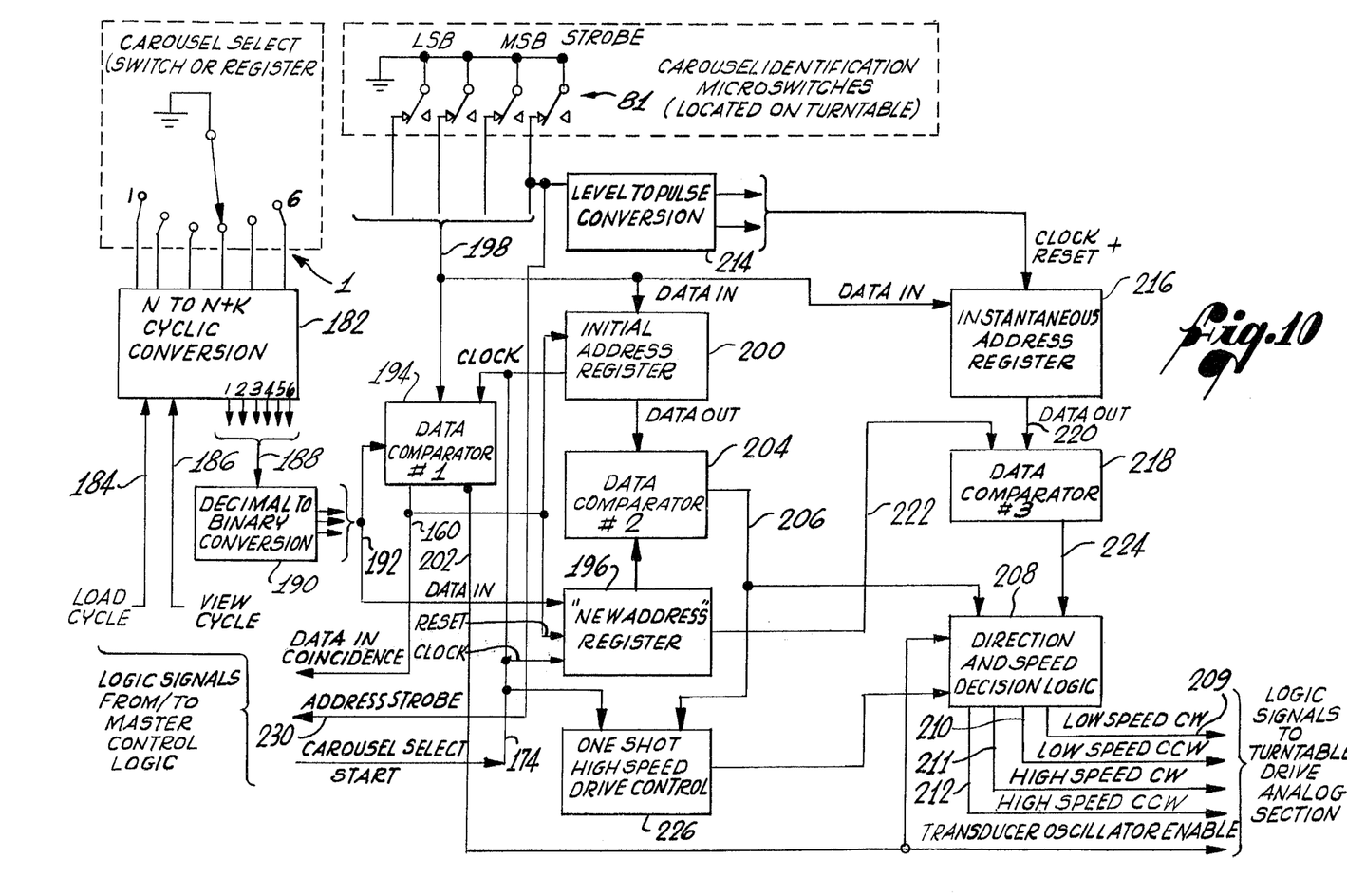
FIG. 10 is a more detailed block diagram of the turntable drive logic of FIGS. 8 and 9.

The principal function of the turntable drive logic 114 is to determine whether or not the turntable 22 must be turned, and, if so, in which direction and at what speed it must be turned. As indicated in FIG. 10, a carousel selection, indicated within the broken lines 180 is either made in the keyboard 102 or provided by the serial interface 112 (FIG. 8). This selection is first processed by a conversion block 182, which is responsive to load or view commands, indicated as being provided over lines 184 and 186, respectively. For the view or select cycle, the processing block 182 merely transmits the incoming signal from block 180 over lines 188 to a decimal-to-binary conversion circuit 190. If, however, a load cycle is selected, the conversion logic in block 182 adds a factor k to the switch setting, in order to position the turntable 22 so that the selected carousel is offset from the retrieval station position, to facilitate removal of a fiche or loading of a replacement fiche in the carousel.

The decimal-to-binary conversion circuit 190 provides a binary selected address signal on lines 192, and these are supplied to a first data comparator 194 and to a new address register 196. The first comparator 194 also receives address data from the carousel identification switches 81 over lines 198 and generates a data-in-coincidence signal on line 160 when the two input addresses are identical.

When the turntable drive logic 114 is first enabled by means of a signal on line 174 from the master control logic 100, the selected address from the binary-to-decimal conversion circuit 190 is clocked into the new address register 196, and the present address from the switches 81 is clocked into an initial address register 200. The select-start signal on line 174 is also applied to the first comparator 194, and has the effect of inhibiting an oscillator-enable signal on line 202 from the comparator, if there is no coincidence of input data when the select-start signal occurs. The contents of the initial address register 200 and the new address register 196 are compared in a second data comparator 204, and the result on line 206 is transmitted to direction and speed decision logic 208, where a decision is made as to the direction and speed of the turntable 22. Speed control lines 209-212 are selectively enabled by the direction and speed decision logic 208, to control the turntable speed through the turntable drive analog section 116.

When a carousel 20, approaching the retrieval station 24, reaches a preselected position with respect to the retrieval station, the switches 81, including three address switches and a strobe switch, are actuated. The signal from the strobe switch is converted to a pulse in a level-to-pulse conversion circuit 214, the pulse being used to clock address data from the switches 81 into an instantaneous address register 216. This instantaneous address in the register 216 is continuously transmitted to a third data comparator 218, over line 220, other inputs to the third data comparator being provided over line 222 from the new address register 196. This third data comparator 218 compares the instantaneous address with the selected address in the new address register 196, and generates an output signal on line 224 when the instantaneous address is within plus or minus one of the new or selected address. This indicates that the carousel that is presently 60 degrees from the operating position of the retrieval station 24 is the carousel that has been requested by the operator. The output line 224 is also connected to the direction and speed decision logic 208, and indicates that the turntable drive motor 72 should be switched from high-speed to low-speed drive.

A one-shot high-speed drive control circuit 226 is actuated by the carousel selection drive command on line 174 and generates a high-speed drive signal for the time required to drive the turntable 22 through approximately 25 degrees. This signal is always fed to the direction and speed decision logic 208 but is effective only when the new carousel address is initially within plus or minus one of the instantaneous carousel address, and the high speed command line is off. The logic 208 switches the drive motor 72 to low-speed operation after the turntable has turned through the 25-degree angle. The direction and speed decision logic 208 in general provides the speed and direction control signals on lines 209-212 to the turntable drive analog section 116, in response to signals provided by the second and third data comparators 204 and 218, and by the one-shot control circuitry 226. The selected direction will be such as to take the shortest time to reach the selected carousel. The speed will initially be the higher of two speeds, and will subsequently be reduced to the lower speed when either: (a) the one-shot drive control 226 has timed out its associated delay for rotation from an initial position only one carousel address from the selected one, or (b) comparator 218 indicates that the instantaneous carousel address is within one of the selected address.

The oscillator enable signal on line 202 from the first data comparator 194 is also provided to the direction and speed decision logic 208, to indicate that the address data from the carousel identification switches 81 is in coincidence with the selected address, and that the turntable is under servo control. The control signal on line 202 is also transmitted to the turntable drive analog section 116 to enable the proximity transducer system 126. In addition to the control lines to the master control logic 100 already mentioned, there is an address strobe line 230, which indicates to the machine timing control 150 (FIG. 9) that the turntable 22 is closely approaching an operative carousel position.

The turntable drive analog section 116 is shown in more detail in (FIG. 11), and may be broken into three basic sections: drive pulse generation circuitry, programmed drive gating circuitry, and a servo drive subsystem. The drive pulse generation circuitry generates pulse-width-modulated control signals for application to the turntable drive motor 72. The drive pulse generation circuitry includes the signal shaping circuit 246, a first integrator 248, a second integrator 250, a peak detector 252, an inverter 254, a first summing amplifier 256, a second summing amplifier 258, two comparators 260 and 262, and the drive motor power amplifier 118. A sixty-cycle signal is applied to the signal shaping circuit 246 to produce a square wave on line 266, which is applied to the first integrator 248. The output of the integrator 248 is a triangular wave on line 268, which is transmitted to the peak detector 252, and also fed back through the second integrator 250 to the input of the first integrator 248. The output from the first integrator 248 is also applied to inputs of the first and second summing amplifiers 256 and 258. A second input of the first summing amplifier 256 is derived from the output of the peak detector on line 270. It is a dc level which follows the peaks of the triangular output voltage from 246, and the output voltage from integrator 248 is also fed to the inverter 254, and thence by line 272 as an input to the second summing amplifier 258. The outputs of the summing amplifiers 256 and 258, on lines 274 and 276, respectively, are fed to the respective comparators 260 and 262. The other comparator input is provided on line 278 from the drive gating circuits to be discussed. The outputs of the comparators 260 and 262 are connected in common to line 280, and fed to the power amplifier 118 and thence to the turntable drive motor 72.

Figure 7:
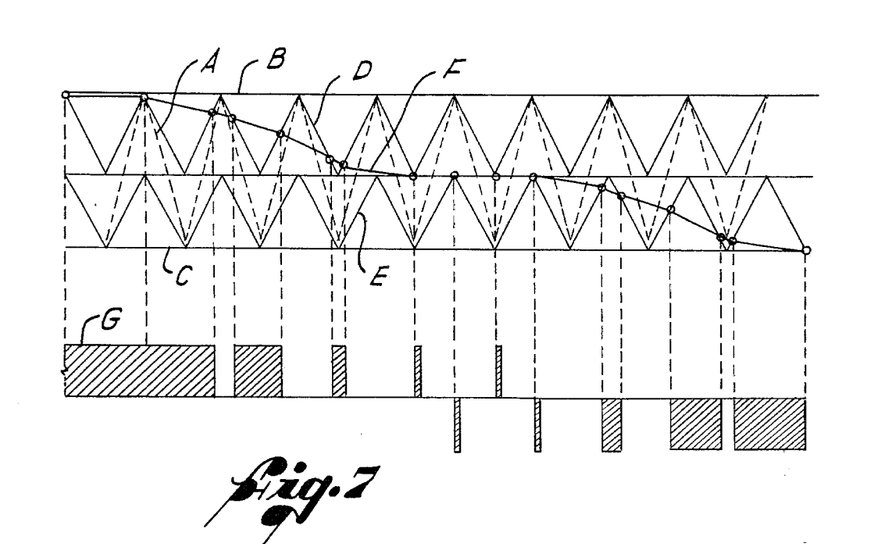
FIG. 7 is a set of signal waveforms relating to circuitry shown in FIG. 11.

Operation of the drive pulse generation circuitry 240 can best be appreciated by consideration of the waveforms in FIG. 7. The waveforms indicated by letters A-G represent the signals at points bearing corresponding letters in FIG. 11. Waveform A is the triangular output on line 268 from the first integrator 248. Waveform B is the peak detector output on line 270, and is therefore a fixed positive voltage level at the peak positive excursion of the triangular wave A. Similarly, waveform C is the output of the inverter 254 and represents a peak negative level of the triangular wave A. Waveform D represents a signal proportional to the sum of waveforms A and B and is therefore a triangular wave with excursions between zero and a positive value. Similarly, waveform E represents the sum of waveforms A and C, and is therefore a triangular wave having excursions between zero and a negative value. Waveform F is shown by way of example as a drive signal that is initially positive, falls to zero, and then to a negative value. The first comparator 260 compares this waveform F with waveform D from summing amplifier 274, and the second comparator 262 compares waveform F with the negative triangular, i.e., waveform E. The result is that a drive pulse, shown as waveform G on line 280, is generated whenever the control signal in waveform F is larger than either of the signals D or E. More specifically, when waveform F is more positive than waveform D, a positive drive pulse is generated, and when waveform F is more negative than waveform E, a negative drive pulse is generated, as indicated in the exemplary waveform G shown in the figure. The drive pulses of waveform G on line 280 are amplified in the power amplifier 118 and transmitted to the turntable drive motor 72, the speed and direction of which is thereby controlled by the drive pulses.

Figure 11:
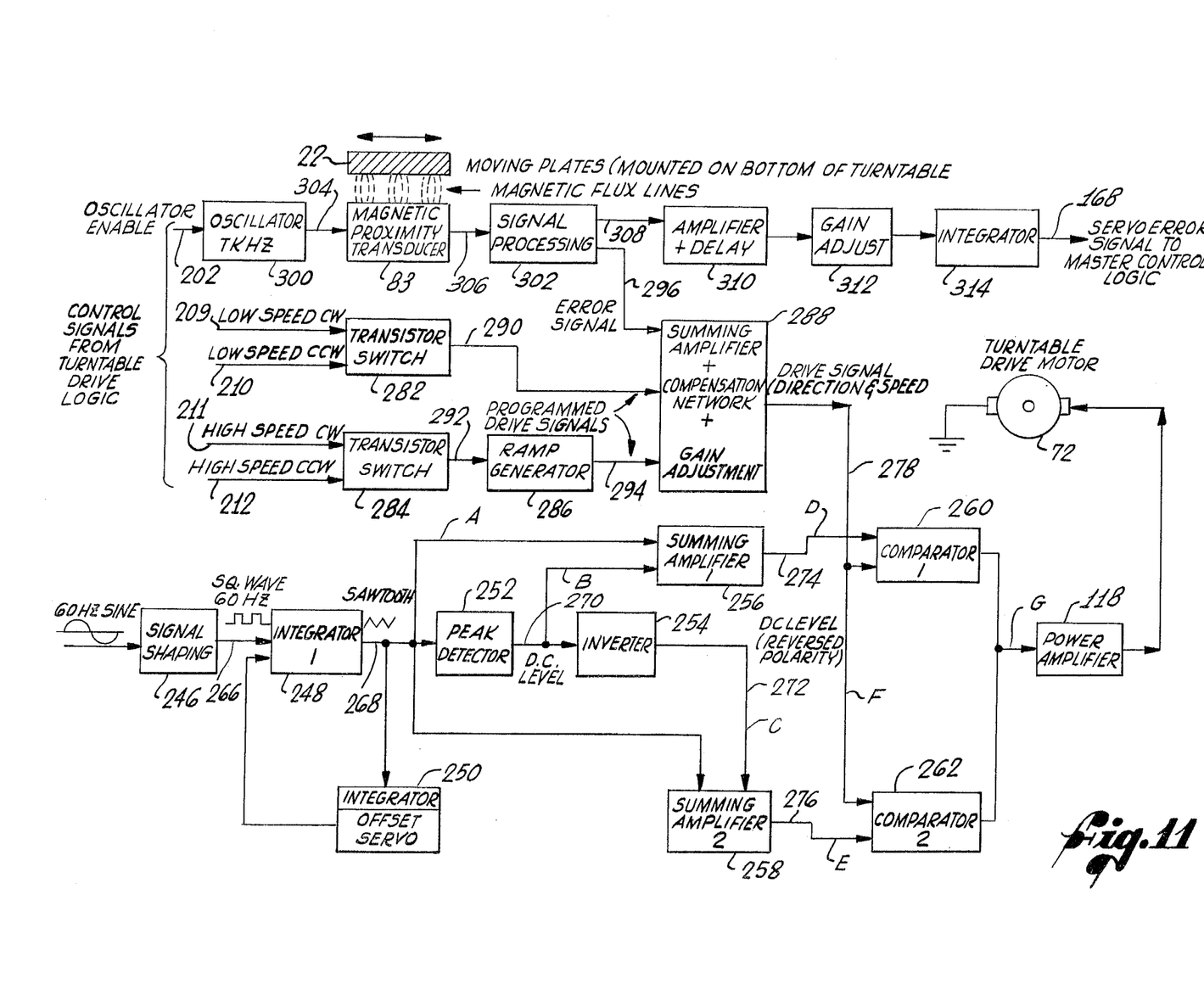
FIG. 11 is a more detailed block diagram of the turntable drive analog section of FIGS. 8 and 9.

The programmed drive gating circuitry 242 processes the four speed and direction command signals on lines 209-212, and generates corresponding motor control signals on line 278. The circuitry 242 includes two transistor switches 282 and 284, a ramp generator 286, and additional circuitry indicated at 288, including a summing amplifier, servo compensation network, and gain adjustment circuitry. The transistor switches 282 and 284 provide different outputs on their output lines 290 and 292, respectively, depending which direction is selected. The output of transistor switch 284 on line 292 is connected to the ramp generator 286, which further modifies the control signal to permit the motor drive 72 to be turned off or on gradually if high-speed of operation has been selected, thereby preventing large startup currents and excessive forces in the drive motor system. The compensation network included in block 288 is necessary to optimize the servo response of the system, and the gain adjustment circuitry is needed to allow for various mechanical tolerances inherent in the system. The summing amplifier within circuitry 288 sums the signals on lines 290, 294, and 296, only one of which will be active at any time. The circuitry 288 generates the appropriate control signal (waveform F) on line 278 to the drive pulse generation circuitry 240 as discussed above.

The additional servo system circuitry includes an oscillator 300, the magnetic proximity transducer 83 and transducer signal processing circuitry 302. The oscillator 300 is enabled by a signal on line 202 from the turntable drive logic 114 when the turntable is approaching a position of alignment of the selected carousel with the retrieval station 24. The oscillator 300 provides a drive signal to the proximity transducer 83, over line 304, and the sensing coils 86 of the transducer provide outputs over line 306 to the signal processing circuitry 302. The output of the signal processing circuitry 302, on line 296 to the circuitry 288, is a servo error signal indicative of the degree of misalignment of one of the transducer plates 87 mounted on the turntable 22, with the magnetic proximity transducer 83.

The servo subsystem includes a closed loop comprising the proximity transducer 83, the signal processing circuitry 302, the summing amplifier within the circuitry 288, comparators 260 and 262, power amplifier 118, the turntable drive motor 72, and the moving transducer plate 87 on the turntable 22.

When the strobe switch associated with the carousel address switches 81 of the desired carousel is actuated, the turntable drive logic 114 receives an indication that the carousel is within in + or −1.6 degrees of its operating position. At this point, the programmed slow-speed signal for the turntable motor drive 72 is turned off and the servo oscillator 300 is turned on. Thereafter, the transducer 83 generates an error signal on line 296 that is proportional to the displacement of the moving plate 87 from the center position. This signal is processed and amplified, then fed to the turntable drive motor 72 to move the turntable to the desired position.

The output of the signal processing circuitry 302 is also supplied over line 308 to an amplifier and delay circuit 310, and thence through a gain adjustment circuit 312 and an integrator 314, the output of which provides a zero servo error signal on line 168 to the master control logic 100. This signal indicates that the turntable 22 is in its desired operating position. The turntable drive circuits can then be disabled, and the master control logic 100 can continue with the selection cycle, the next step being to activate the retrieval station drive motor 40, so that the retrieval station 24 may be moved into its operative position for selection of a fiche from the selected carousel.

Figure 12:
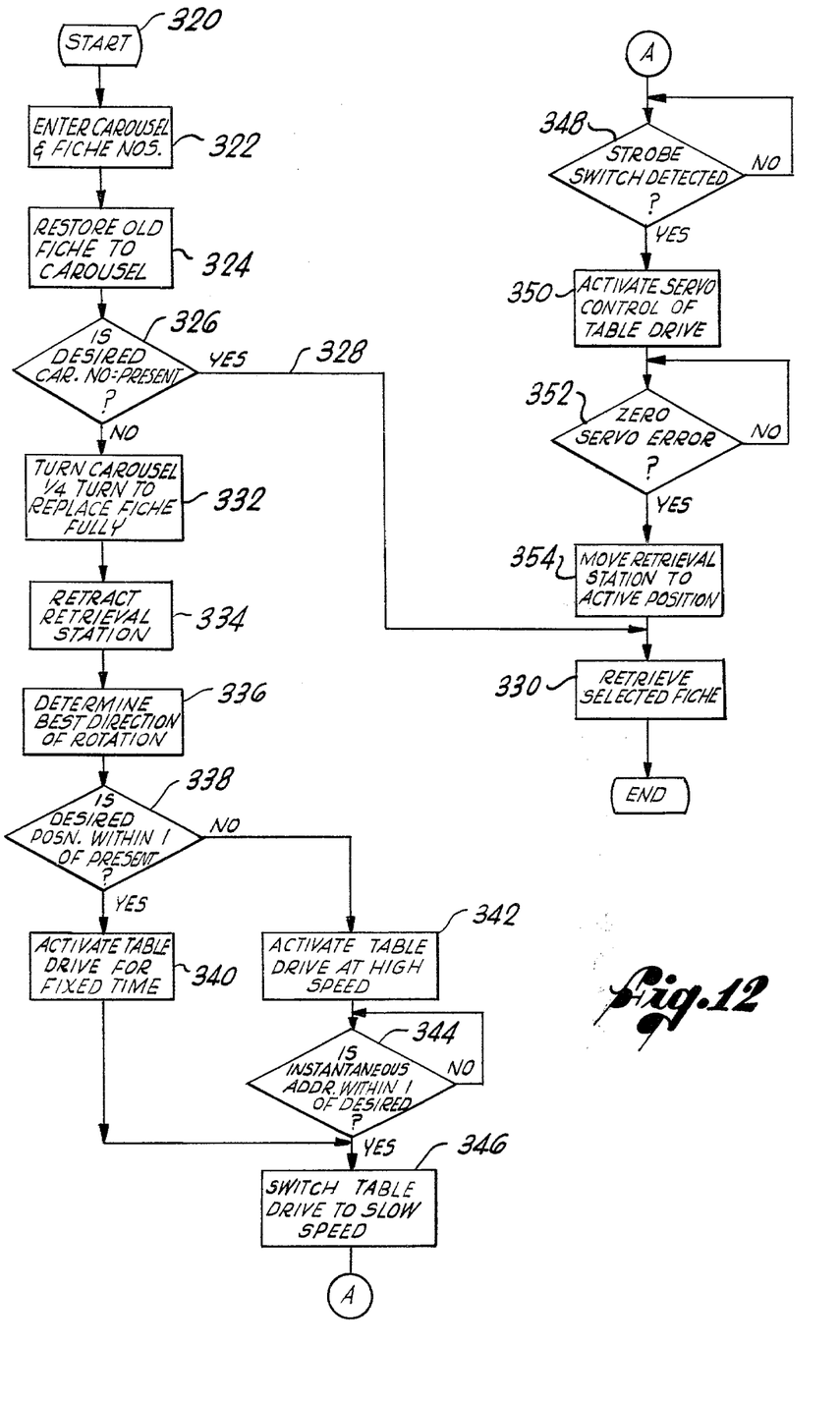
FIG. 12 is a flow chart showing the functions performed by the system.

Overall operation of the system of the invention will perhaps be better understood by consideration of the functional flowchart illustrated in FIG. 12. At the start of a select cycle indicated at 320, the carousel, fiche and page numbers are first entered into the system by the operator, as indicated at 322. Next, the fiche, if any, currently being displayed is restored to the carousel presently positioned at the retrieval station 24, as indicated at 324. This step involves retracting mechanical spreader arms used to spread the fiche on each side of the selected fiche in the carousel, and waiting until such time as the spreader arms have been retracted.

Next, the question is posed, in the block 326, whether the desired carousel number is already equal to the present carousel number. If the answer is yes, control is transferred over line 328 to step 330, in which a selected fiche is retrieved from the carousel already in position at the retrieval station. If the desired carousel number is not equal to the present carousel number, the presently positioned carousel is turned by approximately a quarter-turn, as indicated at block 332, to replace the previously displayed fiche practically all the way back in the carousel before retracting the retrieval station. Then the retrieval station is retracted, as indicated at block 334, by actuating the retrieval station drive motor 40 and waiting until the retrieval station rear switch 122a is closed, at which time the retrieval station drive motor is turned off.

Next, as indicated in block 336 a determination is made of the best direction of rotation, so that the least amount of time will be used in relocating the turntable. Then, in block 338, the question is asked whether the desired position of the turntable is within one carousel of the present position. If the answer is yes, the turntable drive is activated at high-speed for a fixed time, as indicated in block 340. This operation is controlled by the one-shot high-speed drive control 226 (FIG. 10). If the desired position is further than one carousel position of the present position, the turntable drive is activated at high-speed, as indicated in block 342, and the instantaneous carousel address is monitored, as indicated in block 344, until the address is within one of the desired address. When it is, the table drive is switched to low-speed, as indicated in block 346. Control is also transferred to block 346 after the fixed-time high-speed rotation effected in block 340. After switching to low-speed operation (in block 346), the strobe switch status is monitored, as indicated in block 348. As previously discussed, the strobe switch will be closed when the turntable reaches a position 1.6 degrees away from the desired operating position, and when this occurs, the servo control subsystem of the turntable drive will be actuated, as indicated in block 350. Then the zero servo error signal will be monitored, as indicated in block 352, until a zero servo error signal is obtained on line 168 from the turntable drive analog section 116. At this point, the turntable 22 has been positioned at its desired location, and the retrieval station is moved to its operative position, as indicated in block 354. Finally, the selected fiche in the selected carousel is retrieved, as indicated in block 330, thereby ending the selection sequence.

The load sequence, used to store or replace a fiche is almost identical with the select sequence, except that the turntable 22 is positioned such that the carousel in which a fiche is to be loaded is displaced from the retrieval station 24 by a convenient angle, such as 120 degrees, to facilitate operator access to the fiche. The load sequence is effected by adding a factor, such as two carousel positions, to the desired carousel position, and then performing the sequence of steps beginning with that shown in block 324. At the end of the sequence, the fiche to be removed or replaced will be projecting out from the other fiche in the carousel by a fraction of an inch, so that it may be easily identified for removal.

One remaining optional feature yet to be discussed is an electromechanical detent mechanism, best shown in FIG. 4. The mechanism comprises a roller 400 at one end of a lever arm 402, which is actuated by means of a rod 404 and gear wheel 406, in much the same manner as the retrieval station retraction mechanism shown in FIG. 3. A separate drive motor (not shown) drives a pinion 408, and thereby rotates the gear wheel, 406, which provides an axial component of motion to the rod 404. Rotation of the gear wheel 406 pivots the lever 402 and moves the roller 400 in a substantially radial direction with respect to the turntable 22. On the turntable 22 are six notched plates 410, which may be conveniently mounted with the actuating segments 82 used in association with the carousel identifying switches 81. In this optional detent arrangement, the turntable drive may be disabled when the turntable reaches its desired position, using the mechanism shown in FIG. 2, and the detent mechanism simultaneously enabled, to provide a relatively large mechanical detent force between the roller 400 and notched plate 410.

It will be appreciated from the foregoing that the present invention represents a significant advance in the field of microfiche storage and retrieval systems. In particular, it provides a system of much larger capacity than has previously been available, while still making relatively efficient use of available storage space. It will also be appreciated that, although a specific embodiment of the invention has been described for purposes of illustration, various modifications may be made without departing from the spirit and scope of the invention. Accordingly, the invention is not to be limited except as by the appended claims.

We claim:

1. A multiple-carousel microfiche storage and retrieval system, comprising:
    a turntable;
    a plurality of storage carousels for holding a plurality of fiche, each of said carousels being rotatably mounted on said turntable;
    retrieval station means, for retrieving a fiche from and replacing a fiche in one of said carousels;
    means for rotating said turntable;
    means for rotating each of said carousels and locating a selected fiche stored therein; and
    control means for coordinating operation of said two means for rotating and said retrieval station means, to position a selected one of said carousels at said retrieval station means and to initiate retrieval and replacement operations by said retrieval station means.

2. A multiple-carousel microfiche storage and retrieval system as set forth in claim 1, wherein said retrieval station means includes;
    a base-plate pivotally connected to said frame;

fiche selection means affixed to said base-plate, for locating, removing and replacing a selected fiche; and retraction means, for moving said base-plate and said fiche selection means between an operative position and a retracted position, to permit rotation of said turntable.

3. A multiple-carousel microfiche storage and retrieval system as set forth in claim 2, wherein said retraction means includes resilient means to urge said fiche selection means into the operative position when moved to such position.

4. A multiple-carousel microfiche storage and retrieval system as set forth in claim 2, wherein said retraction means includes:

a drive motor mounted on said base-plate an actuating rod having one end resiliently connected to said frame; and a driven member mounted for rotation on said base-plate and coupled to said drive motor and to the other end of said actuating rod, to impart an axial component of motion thereto when driven by said drive motor;

whereby said base-plate is moved pivotally upon actuation of said drive motor.

5. A multiple-carousel microfiche storage and retrieval system as set forth in claim 4, wherein:

said driven member is a gear wheel having an upstanding post thereon for engagement with a corresponding hole in said rod.

6. A multiple-carousel microfiche storage and retrieval system as set forth in claim 1, wherein:

said means for rotating said turntable includes a reversible drive motor; and said control means includes means for determining an optimum direction and speed for said drive motor, means for sensing which carousel is approaching the operative position, servo control means for controlling the speed of said drive motor as the selected carousel closely approaches alignment with said retrieval station means.

7. A multiple-carousel microfiche storage and retrieval system as set forth in claim 6, wherein said means for determining an optimum direction and speed includes:

means for initially comparing a selected carousel address with a current carousel address and determining therefrom a direction and speed of rotation; and means for continuously comparing the selected carousel address with the current carousel address and decreasing the speed of rotation when the current address is within a predetermined range of the selected address.

8. A multiple-carousel microfiche storage and retrieval system as set forth in claim 6, wherein said control means further includes:

detection means for generating a strobe signal when the selected carousel is within a predetermined angular range of the location of said retrieval station means; and means for actuating said servo control means in response to a strobe signal from said detection means.

9. A multiple-carousel microfiche storage and retrieval system, comprising:

a frame;

a turntable rotatable about a central axis with respect to said frame;

a plurality of storage carousels for holding a plurality of fiche, each of said carousels being rotatably mounted in a circular configuration on said turntable;

a retrieval station mounted on said frame, and movable between an operative position and a retracted position and including a fiche selector for locating, removing and replacing a selected fiche;

retrieval station retraction means for moving said retrieval station between the operative and retracted positions;

carousel drive means, for rotating the selected one of said carousels when positioned in an operative relationship with said retrieval station;

a turntable drive motor;

a plurality of carousel identifier elements affixed to said turntable;

carousel indentifier sensing means, for sensing said carousel identifier elements and providing electrical signals indicative of a current carousel address;

transducer means for sensing the degree of displacement of said turntable from any of its plurality of operative positions, there being as many operative positions as there are carousels; and control means for coordinating operation of said system, to position a selected one of said carousels in an operative position, to move said retrieval station to its operative position, and to initiate withdrawl of a selected fiche from said selected carousel.

10. A multiple-carousel microfiche storage and retrieval system as set forth in claim 9, wherein said control means includes:

means for selecting an optimum direction and initial speed of rotation of said turntable;

means for generating drive motor control signals to said turntable drive motor to rotate said turntable at the selected speed and in the selected direction;

means for generating control signals to slow said turntable drive motor when the current carousel address is within a preselected number of the selected carousel address; and servo control means for generating drive motor control signals when the selected carousel is within a narrow angular range of the selected operative position.

11. A multiple-carousel microfiche storage and retrieval system as set forth in claim 9, wherein:

said carousel identifier sensing means includes a plurality of electrical switches located on said frame; and said carousel identifier elements are sets of coded switch actuator plates affixed to said turntable, there being one set of said actuator plates for each of said carousels.

12. A multiple-carousel microfiche storage and retrieval system as set forth in claim 9, wherein said transducer means includes:

a core of magnetic material disposed close to said turntable and fixed with respect to said frame;

a drive winding on said core to which an alternating-current signal is applied;

two sensing windings disposed symmetrically on said core; and a plurality of flux plates spaced about said turntable and corresponding to carousel positions;

and wherein identical currents will be induced in said sensing windows only when one of said flux plates is exactly centered with respect to said transducer core.

13. A method of operation of a multiple-carousel microfiche storage and retrieval system having a plurality of fiche storage carousels rotatably mounted on a rotatable turntable, said method comprising the steps of:
receiving operator instructions including a carousel identifier and a fiche indentifier;
checking a current carousel address to determine if the turntable must be rotated;
replacing a previously displayed fiche in the currently used carousel;
retracting a retrieval station used to retrieve and replace fiche;
rotating the turntable at an optimum speed and direction to position the selected carousel in an operative position adjacent to the retrieval station; and
moving the retrieval station back to an operative position to select the desired fiche in the selected carousel.

14. A method as set forth in claim 13, wherein said rotating step includes:
first comparing the selected carousel address with the current carousel address;
determining from said first comparing step the optimum direction and initial speed of rotation;
comparing the selected carousel address with the current carousel address during rotation;
slowing the speed of rotation when the current carousel address is within a preselected range of the selected carousel address;
detecting the arrival of the selected carousel at an angular location within a preselected angular range of the operative position;
actuating a servo control system, in response to said detecting step;
controlling the turntable rotation by means of the servo control system, for precise positioning of the selected carousel at the operative position.

15. A method as set forth in claim 14, wherein said detecting step and said comparing steps include reading sensors located on the turntable, to provide current address data as well as an indication that the turntable is within the preselected angular range of the operative position.

16. A method as set forth in claim 14, wherein said controlling step includes the steps of:
generating an error signal indicative of the displacement of the turntable from the desired operative position; and
generating drive motor power signal pulses based on the level of the error signal, to drive the turntable toward the operative position, at which time the error signal generated in said first generating step is practically zero.

\* \* \* \* \*